A. CAPPELAERE.
RETTING PLANT.
APPLICATION FILED JULY 2, 1907.

908,840.

Patented Jan. 5, 1909.

WITNESSES,

INVENTOR,
ALBERT CAPPELAERE,
BY
Attorneys.

UNITED STATES PATENT OFFICE.

ALBERT CAPPELAERE, OF LILLE, FRANCE, ASSIGNOR TO ROUISSAGES BELGES LEGRAND & CIE. SOCIÉTÉ ANONYME, OF GHENT, BELGIUM.

RETTING PLANT.

No. 908,840.     Specification of Letters Patent.     Patented Jan. 5, 1909.

Application filed July 2, 1907. Serial No. 381,893.

*To all whom it may concern:*

Be it known that I, ALBERT CAPPELAERE, commercial agent, a citizen of the French Republic, and residing at Lille, France, have invented new and useful Improvements in Retting Plants; and I do hereby declare the following to be a full, clear, and exact description of the same.

My present invention relates to retting plants and has for its object to provide a combination of means, whereby the retting of flax and the like may be practiced with the same advantages as if the flax were retted in a natural river.

In the accompanying drawings, I have shown one form of construction of my invention.

Figure 1:
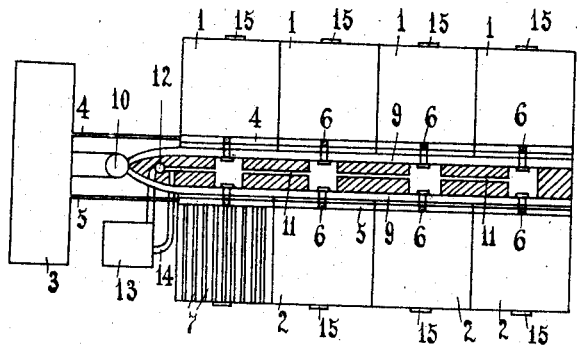
Figure 2:
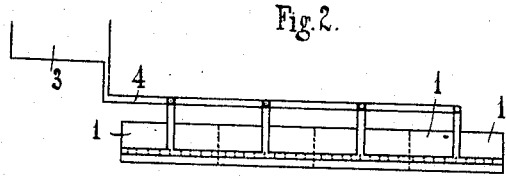
Figure 3:
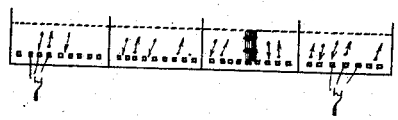
Figure 4:
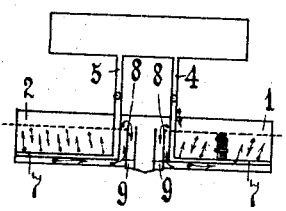

Figure 1 is a plan view thereof. Fig. 2 shows a longitudinal section of the retting tank. Fig. 3 shows a longitudinal section of the flax supporting and water spreading grating. Fig. 4 is a cross section of the tank.

The invention consists of a double series of tanks 1, 1, 1—2, 2, 2, between which are arranged the several admission and discharge conduits, said tanks being provided with water tight doors through which the flax or other material to be treated is introduced into and removed from the same. Said conduits are provided with suitable valves by means of which the several tanks may be put into and out of communication with each other. Said tanks receive fresh or regenerated water from a reservoir 3 and through conduits 4, 5. Each tank has an admission valve 6, and the water is admitted below the flax to be retted in uniform strata by means of wooden grates 7 which support the bundles of flax. The bars of said grates are made hollow and provided with perforations so as to act as sprinklers. The clear water which is less dense than the water already contained in the mass of flax under treatment, rises in the tanks and causes the soiled water to be discharged through over-flows 8, 8 into return conduits 9, 9 whence a pump 10 forces said water back into the feed-reservoir 3 arranged above the retting tanks. In said reservoir the soiled water may be cleaned or regenerated by means of lime, potash or any other suitable basic salt, capable of removing its acidity and precipitating the dissolved organic substances. When the water is thus neutralized and purified, it may be used indefinitely and the retting operation will produce useful by-products. The main discharge conduit 11 receives the water of the first dissolution, which is a mere washing of the easily soluble organic materials. This brown colored water is forced by a pump 12 into the reservoir 13 and likewise regenerated or purified to be again used for a first washing of the flax. To this end, a conduit 14 extends from said reservoir to the main admission conduit.

This new retting plant permits of working in accordance with the variations of production of the seasons. During the fine season it permits of doubling the production by retting in single time in each tank a double layer of material. During the cold season, when no large quantities of flax are available, only a certain number of tanks will be used for treating the same. On the other hand it permits of easily controlling the time and intensity of retting by opening more or less the admission valves.

Having fully described my invention, what I claim and desire to secure by Letters Patent is:—

1. A retting tank provided with a series of horizontal perforated grate-bars, an inlet pipe connecting with said perforated bars, and an overflow pipe, substantially as set forth.

2. A retting tank, provided with a series of perforated grate-bars, a treating tank, an inlet pipe connecting the tank with the said grate bars, and an overflow pipe for the soiled water.

3. A retting tank provided with a series of perforated grate-bars, a treating tank, an inlet pipe connected to the perforated grate-bars, and a pump adapted to force the soiled water from the outlet into the treating tank.

4. A retting tank having perforated grate-bars arranged in several horizontal layers, in combination with an inlet pipe discharging into said grate-bars, and a soiled water overflow pipe, substantially as set forth.

In testimony whereof, I have signed my name to this specification in the presence of two subscribing witnesses.

ALBERT CAPPELAERE.

Witnesses:
  LEON FAURE,
  HENRI VINART.